(12) United States Patent
Iritsuki et al.

(10) Patent No.: US 9,680,168 B2
(45) Date of Patent: Jun. 13, 2017

(54) FUEL CELL STACK

(71) Applicant: NISSAN MOTOR CO., LTD., Kanagawa (JP)

(72) Inventors: Keita Iritsuki, Yokohama (JP); Yosuke Fukuyama, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 487 days.

(21) Appl. No.: 14/385,338

(22) PCT Filed: Mar. 11, 2013

(86) PCT No.: PCT/JP2013/001577
§ 371 (c)(1),
(2) Date: Sep. 15, 2014

(87) PCT Pub. No.: WO2013/136764
PCT Pub. Date: Sep. 19, 2013

(65) Prior Publication Data
US 2015/0037705 A1 Feb. 5, 2015

(30) Foreign Application Priority Data

Mar. 15, 2012 (JP) .................................. 2012-058690
Mar. 27, 2012 (JP) .................................. 2012-071146
Nov. 16, 2012 (JP) .................................. 2012-251803

(51) Int. Cl.
*H01M 8/02* (2016.01)
*H01M 8/04007* (2016.01)
(Continued)

(52) U.S. Cl.
CPC ..... *H01M 8/04074* (2013.01); *H01M 8/0258* (2013.01); *H01M 8/0267* (2013.01);
(Continued)

(58) Field of Classification Search
CPC .................................................. H01M 8/0267
See application file for complete search history.

(56) References Cited

U.S. PATENT DOCUMENTS

2009/0136805 A1  5/2009  Sato et al.
2009/0136811 A1  5/2009  Kusakabe et al.

FOREIGN PATENT DOCUMENTS

JP   2005158670 A   6/2005
JP   2006310288 A   11/2006
(Continued)

*Primary Examiner* — Jonathan Crepeau
(74) *Attorney, Agent, or Firm* — Young Basile Hanlon & MacFarlane, P.C.

(57) ABSTRACT

A fuel cell stack includes cell units stacked on one another and each including a membrane electrode assembly and two separators defining gas passages on both sides of the membrane electrode assembly, a cooling fluid passage for flowing a cooling fluid provided between the separators of each adjacent two of the cell units, and a displacement absorber provided in the cooling fluid passage. The displacement absorber includes elastic protrusions provided in an array and configured to elastically absorb a displacement of the cell units in a stack direction, and flow-spread preventing protrusions provided in an array and configured to prevent the cooling fluid from flowing out of an active area.

15 Claims, 21 Drawing Sheets

(51) Int. Cl.
*H01M 8/247* (2016.01)
*H01M 8/0258* (2016.01)
*H01M 8/0267* (2016.01)
*H01M 8/0273* (2016.01)
*H01M 8/2465* (2016.01)
*H01M 8/1007* (2016.01)
*H01M 8/1018* (2016.01)

(52) U.S. Cl.
CPC ....... *H01M 8/0273* (2013.01); *H01M 8/1007* (2016.02); *H01M 8/247* (2013.01); *H01M 8/2465* (2013.01); *H01M 2008/1095* (2013.01); *H01M 2300/0082* (2013.01)

(56) References Cited

FOREIGN PATENT DOCUMENTS

JP       2011-222393 A    11/2011
JP       2012-129108      *    7/2012

* cited by examiner

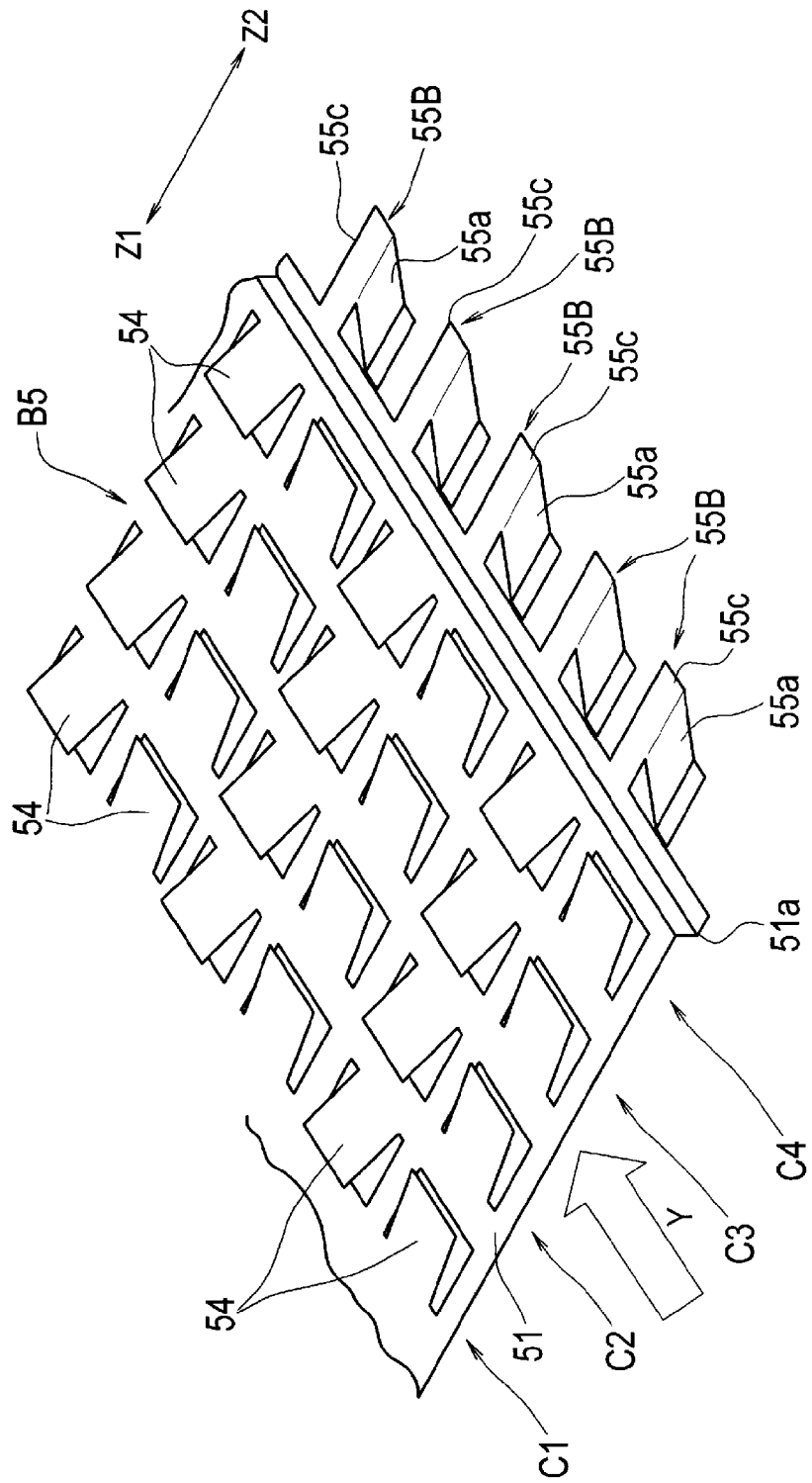

FUEL CELL STACK

CROSS REFERENCE TO RELATED APPLICATIONS

The present application claims priority to Japanese Patent Applications Nos. 2012-058690, filed on Mar. 15, 2012; 2012-071146, filed on Mar. 27, 2012; and 2012-251803, filed on Nov. 16, 2012, each incorporated herein in its entirety.

TECHNICAL FIELD

The present invention relates to a fuel cell stack including a membrane electrode assembly which generates power by using reaction of two types of power generation gases flowing isolatedly from each other.

BACKGROUND

Among techniques related to this type of fuel cell stack, there is one having a configuration disclosed in Japanese Patent Application Publication No. 2005-158670 which is titled "FUEL CELL SYSTEM".

The fuel cell system disclosed in Japanese Patent Application Publication No. 2005-158670 includes: fuel cells each having an electrolyte, a first catalyst layer joined to one side of the electrolyte, a second catalyst layer joined to the other side of the electrolyte, a first electrode joined to the side of the first catalyst layer opposite to the electrolyte, a second electrode joined to the side of the second catalyst layer opposite to the electrolyte, and a separator joined to the first electrode; a first reaction gas supply unit configured to supply a first reaction gas to the first electrode; a second reaction gas supply unit configured to supply a second reaction gas to the second electrode; and a control unit configured to control operations of the fuel cell system. The first electrode has a two-layer-passage structure including an electrolyte-side gas supply passage disposed on the electrolyte side in a stacking direction of the fuel cells and a separator-side gas supply passage disposed on the separator side in the stacking direction.

In the fuel cell system of the related art described above, there is shown a configuration in which a coolant passage portion is formed between the stacked fuel cells and the coolant passage portion includes an elastic body (pre-load plate) for applying a compressive elastic load to the first electrode.

The pre-load plate described above is intended to distribute a load locally generated due to form errors in constituent parts of the fuel cells such as the MEAs, the hydrogen electrodes, the oxygen electrodes, and the coolant passage portions, so that the load can be evenly applied to the constituent parts.

SUMMARY

In order to improve the cooling efficiency, it is preferable for a sufficient amount of coolant (cooling fluid) to flow through a portion for a power generation region (active area) of each fuel cell. However, part of the coolant generally flows out of the power generation region and it is thus difficult to perform cooling sufficiently.

The pre-load plate described above has a problem that the pre-load plate cannot prevent the coolant from flowing out of the active area and the power generation efficiency cannot be improved.

An object of the present invention is to provide a fuel cell stack which absorbs a displacement in a stacking direction of cell units and which can improve the power generation efficiency by preventing a cooling fluid from flowing out of an active area.

A fuel cell stack in accordance with some embodiments includes cell units stacked on one another and each including a membrane electrode assembly and two separators defining gas passages on both sides of the membrane electrode assembly, a cooling fluid passage for flowing a cooling fluid provided between the separators of each adjacent two of the cell units, and a displacement absorber provided in the cooling fluid passage. The displacement absorber includes elastic protrusions provided in an array and configured to elastically absorb a displacement of the cell units in a stack direction, and flow-spread preventing protrusions provided in an array and configured to prevent the cooling fluid from flowing out of an active area.

In the configuration described above, the displacement absorber elastically absorbs a displacement in the stacking direction of the cell units and the flow-spread preventing protrusions formed in the displacement absorber prevent the cooling fluid from flowing out to portions other than the active area facing the membrane electrode assembly, thereby improving the cooling efficiency.

BRIEF DESCRIPTION OF THE DRAWINGS

FIG. 18A is a perspective view for explaining a displacement absorber of a fifth example which forms part of the fuel cell stack shown in FIG. 17.

DETAILED DESCRIPTION OF THE EMBODIMENTS

Figure 1:
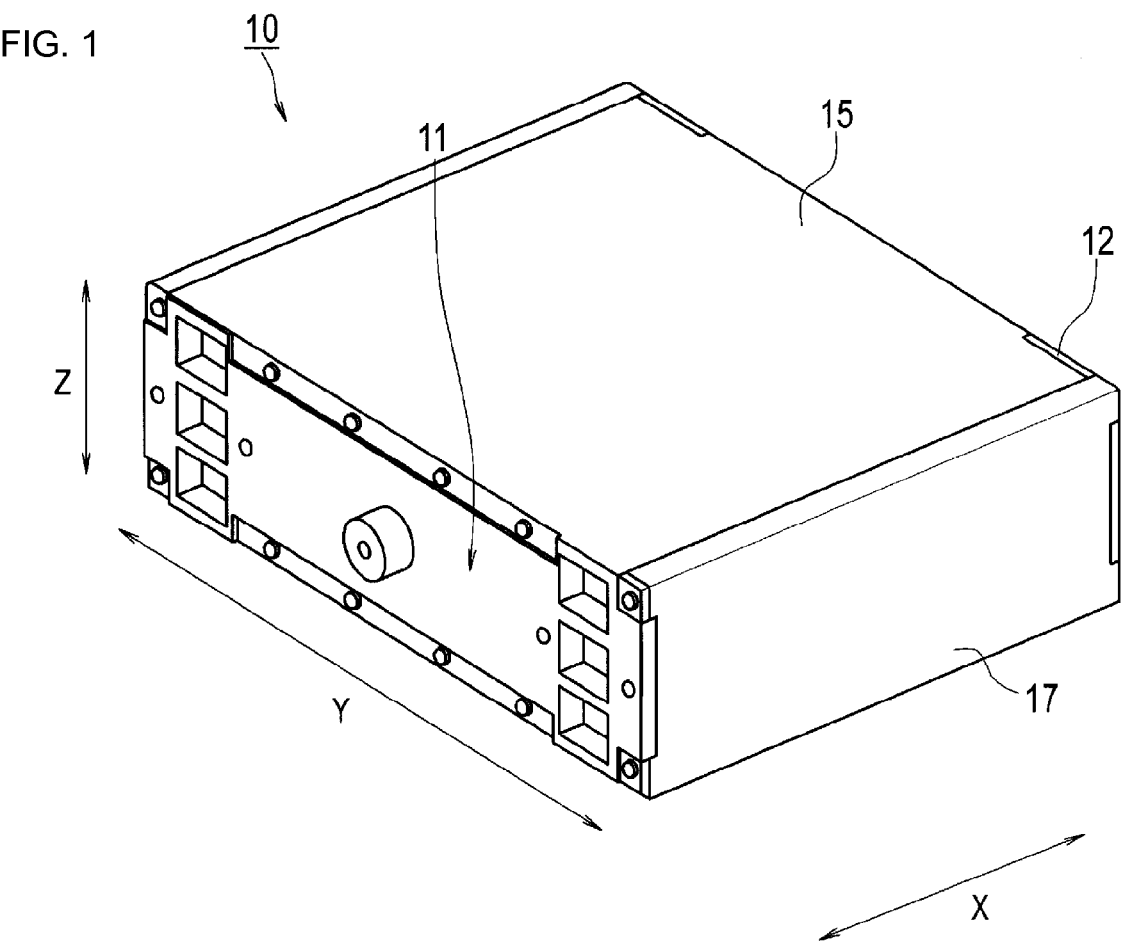
FIG. 1 is a perspective view of an exterior of a fuel cell stack in a first embodiment of the present invention.

An embodiment of the present invention is described below with reference to the drawings. FIG. 1 is a perspective view of an exterior of a fuel cell stack in a first embodiment of the present invention, FIG. 2 is a perspective view of the fuel cell stack shown in an exploded state, and FIG. 3 is a plan view of a cell unit of a first example which forms part of the fuel cell stack.

A fuel cell stack 10 in the first embodiment of the present invention is, for example, a polymer electrolyte fuel cell stack configured to be mounted on a vehicle.

Figure 2:
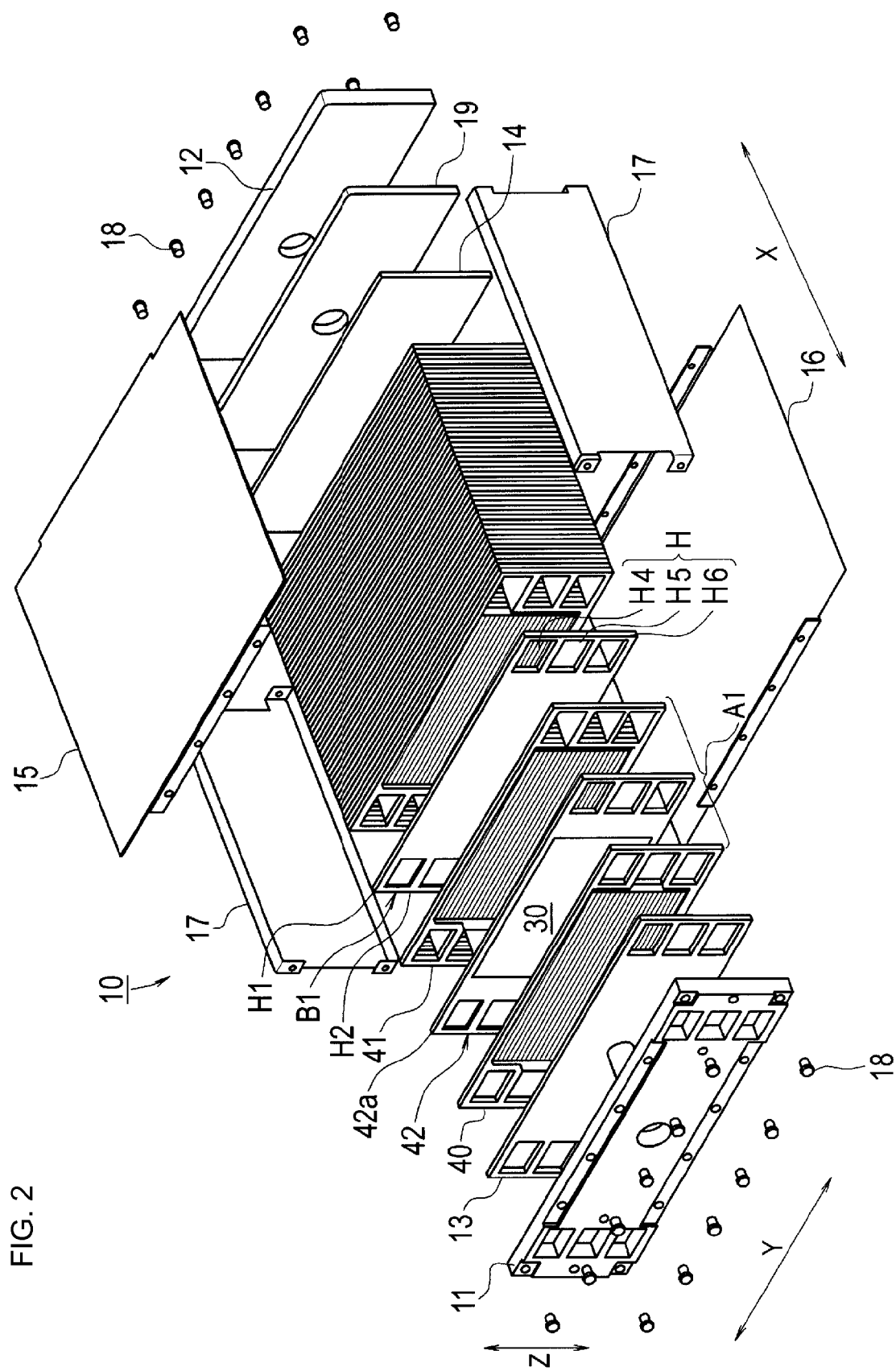
FIG. 2 is a perspective view of the fuel cell stack in the first embodiment of the present invention which is shown in an exploded state.
Figure 3:
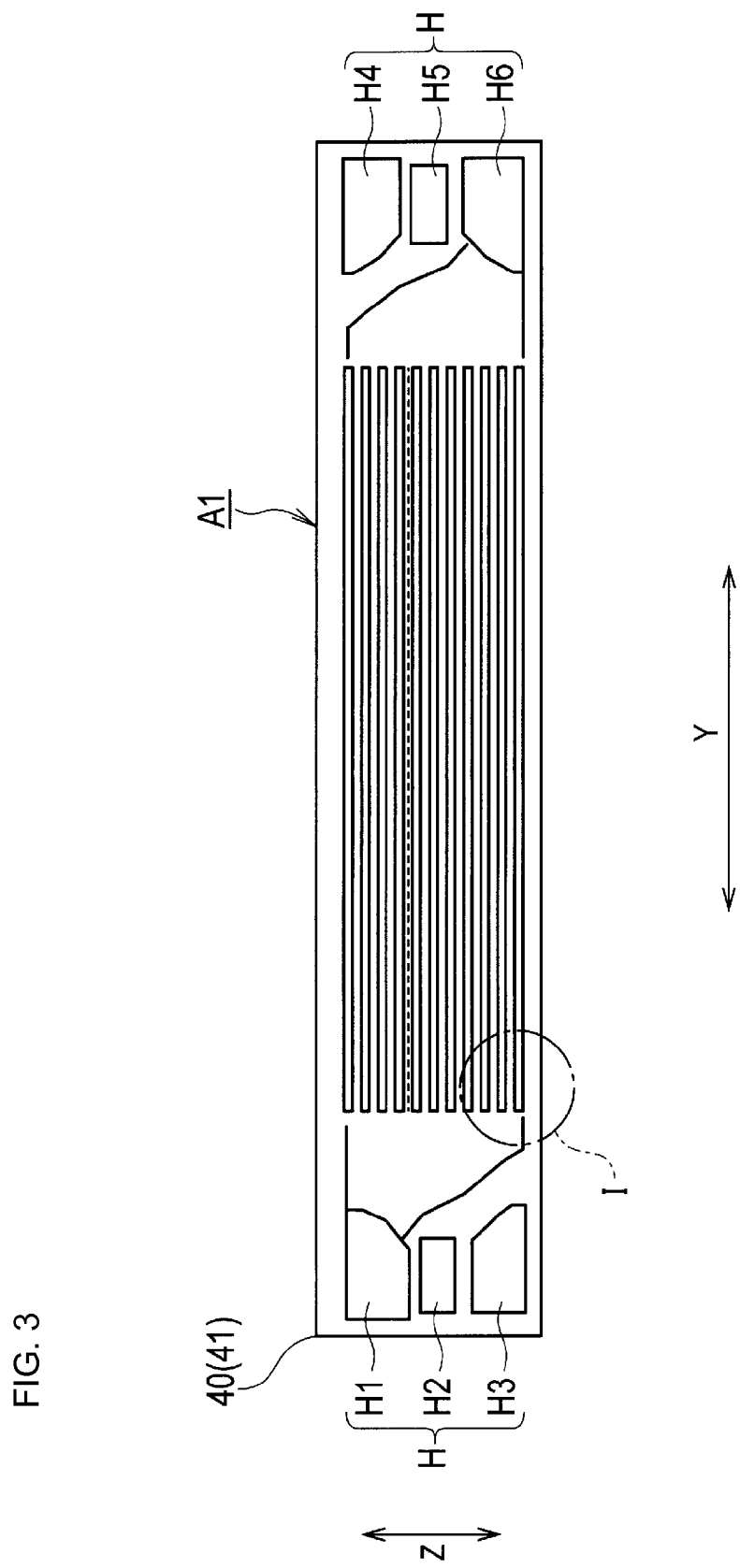
FIG. 3 is a plan view of a cell unit of one example which forms part of the fuel cell stack in the first embodiment of the present invention.

The fuel cell stack 10 shown in FIGS. 1 and 2 is configured such that current collectors 13, 14, multiple cell units (fuel cells) A1, and multiple displacement absorbers B1 of the first example are stacked between paired end plates 11, 12 and fastened together by using fastening plates 15, 16 and reinforcement plates 17, 17 in such a way that the cell units A1 are pressed against each other by the end plates 11, 12. Note that reference numeral 18 denotes bolts and reference numeral 19 denotes a spacer.

In each of the cell units A1, paired separators 40, 41 are disposed in such a way that gas passages for power generation gases to flow are defined respectively on both sides of a cell frame 42.

The "power generation gases" are a hydrogen-containing gas and an oxygen-containing gas.

The cell frame 42 is made of resin. In the embodiment, the cell frame 42 has a horizontal rectangle shape in a front view which is a view in a stacking direction X of the cell units A1, and is provided with a membrane electrode assembly 30 in a center portion of a substrate 42a formed to have a substantially uniform thickness (see FIG. 2).

The membrane electrode assembly 30 is also referred to as MEA and has a structure in which an electrolyte membrane made of solid polymer is held between an anode electrode and a cathode electrode (these parts are not illustrated), for example. A region facing the membrane electrode assembly 30 is an active area (power generation region) a (see FIG. 4).

In the membrane electrode assembly 30 described above, the hydrogen-containing gas flowing through one of the gas passages flows and hits the anode and the oxygen-containing gas flowing through the other one of the gas passages flows and hits the cathode to generate electric power.

As shown in FIG. 3, manifold portions H for supplying and discharging the hydrogen-containing gas and the oxygen-containing gas are formed respectively on both sides of each cell unit A1.

The manifold portion H on one side includes manifold holes H1 to H3. The manifold holes H1 to H3 are for supplying the oxygen-containing gas (H1), supplying cooling fluid (H2), and supplying the hydrogen-containing gas (H3) and each form a passage extending in the stacking direction X shown in FIG. 2.

The manifold portion H on the other side includes manifold holes H4 to H6. The manifold holes H4 to H6 are for discharging the hydrogen-containing gas (H4), discharging cooling fluid (H5), and discharging the oxygen-containing gas (H6) and each form a passage extending in the stacking direction X shown in FIG. 2. The positional relationship of the holes for supplying and the holes for discharging may be partially or entirely opposite.

Figure 4:
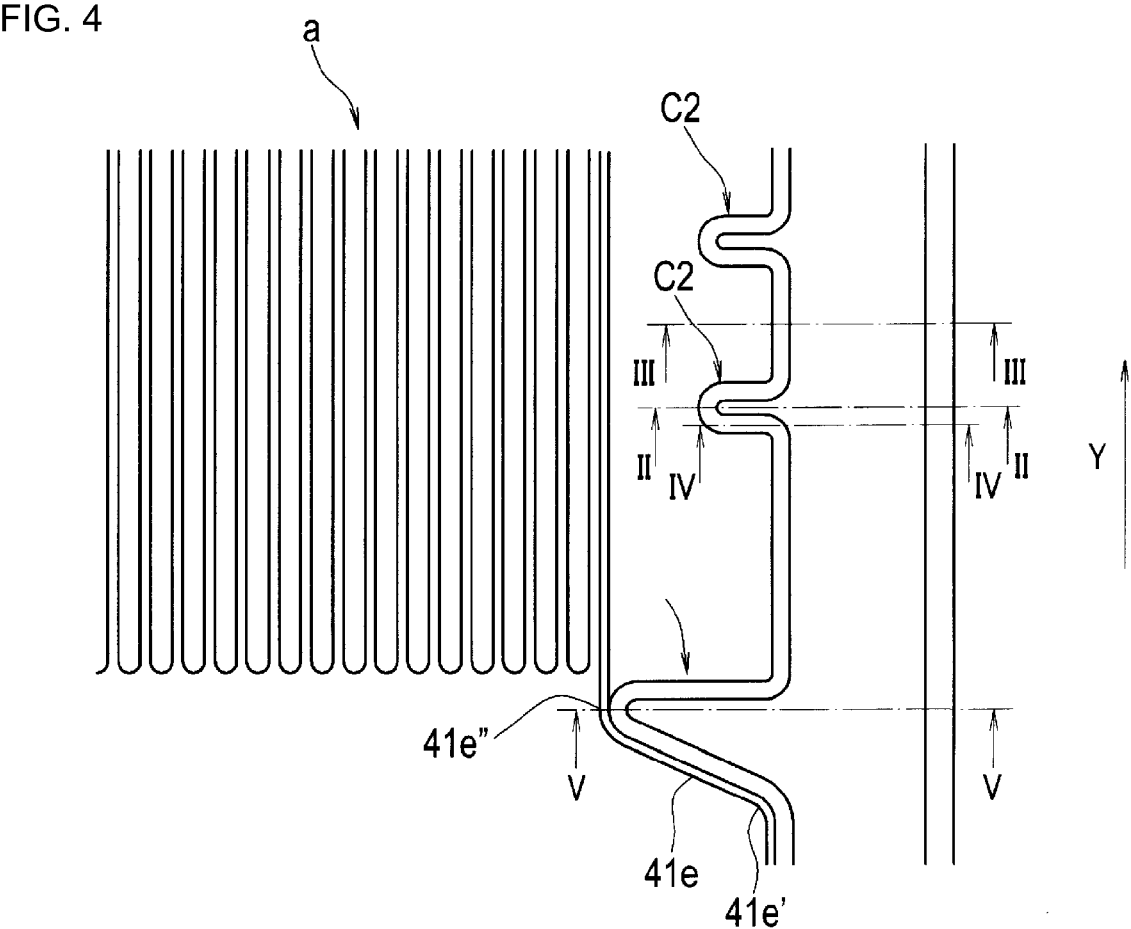
FIG. 4 is a partially enlarged view showing details of a portion in the circle I in FIG. 3.
Figure 5:
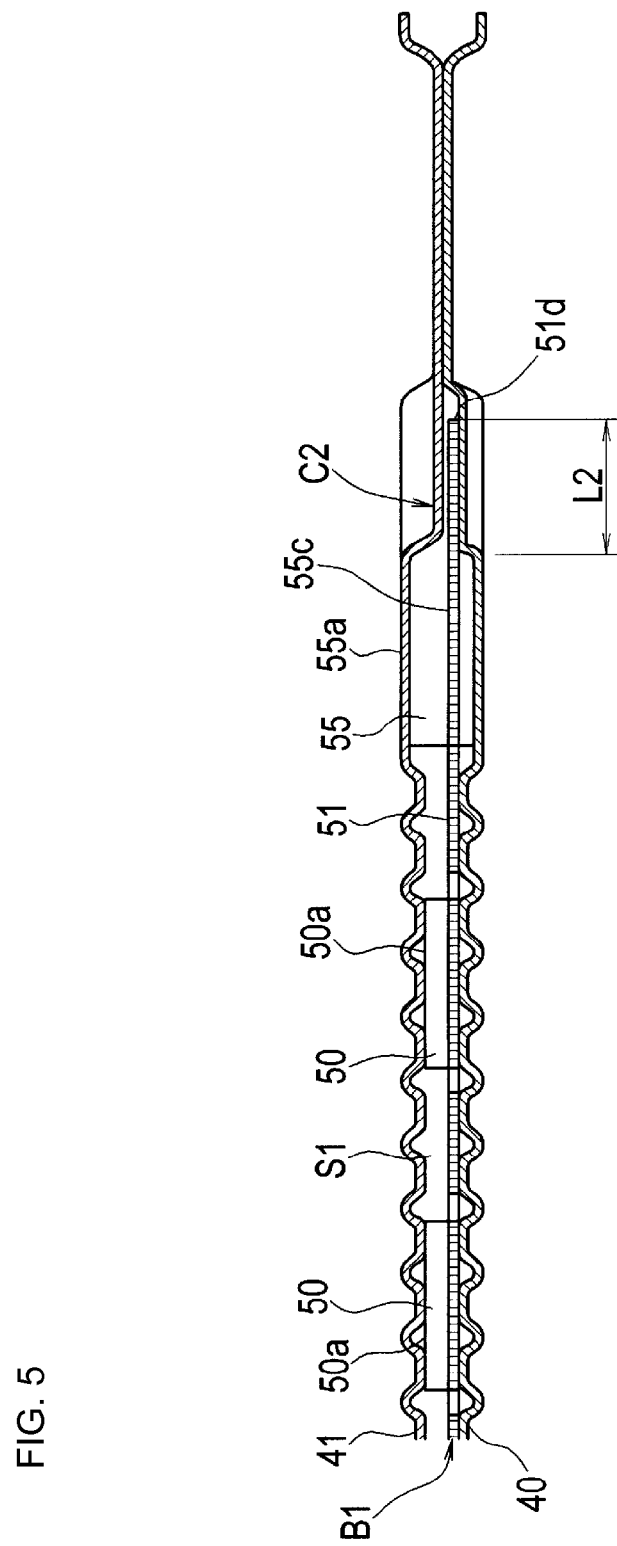
FIG. 5 is a cross-sectional view of a portion along the II-II line shown in FIG. 4.
Figure 6:
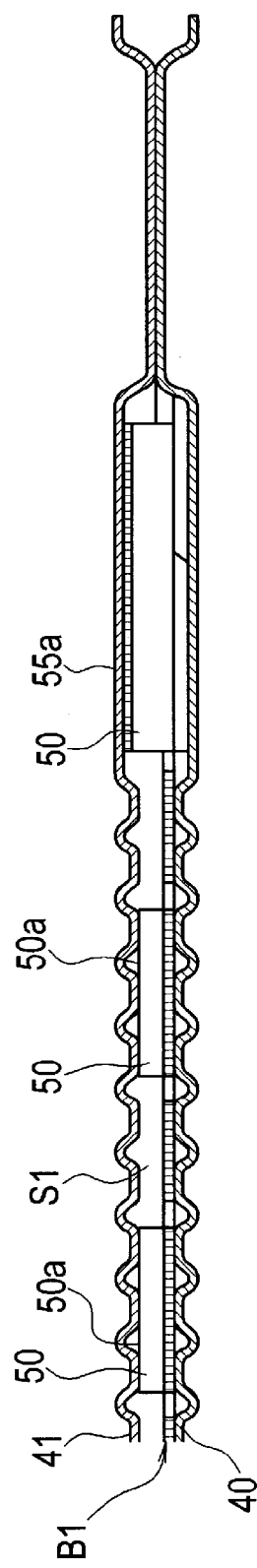
FIG. 6 is a cross-sectional view of a portion along the III-III line shown in FIG. 4.
Figure 7:
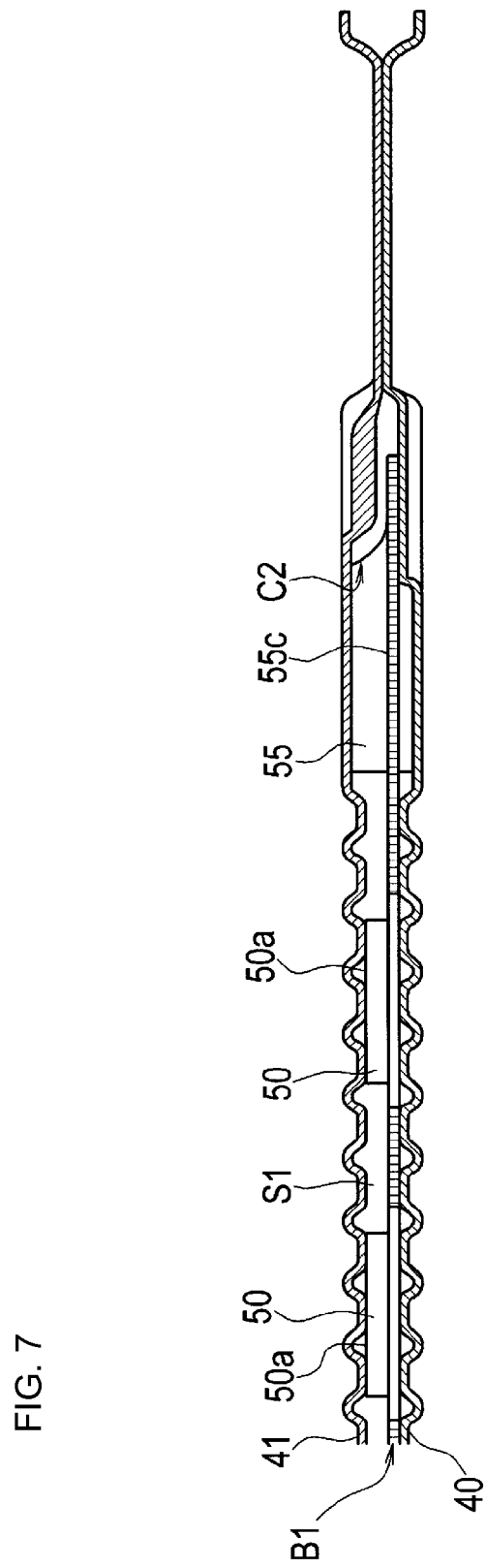
FIG. 7 is a cross-sectional view of a portion along the IV-IV line shown in FIG. 4.
Figure 8:
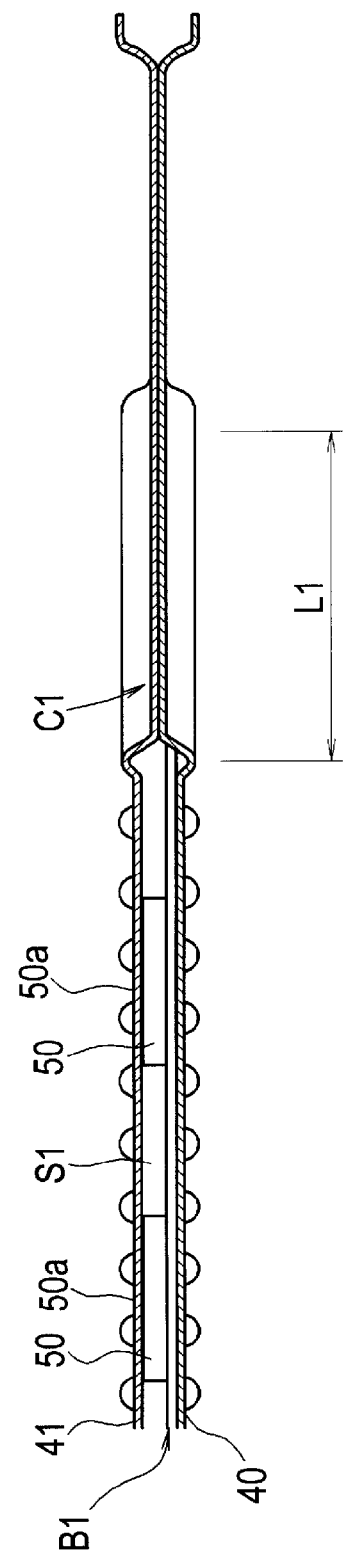
FIG. 8 is a cross-sectional view of a portion along the V-V line shown in FIG. 4.
Figure 9:
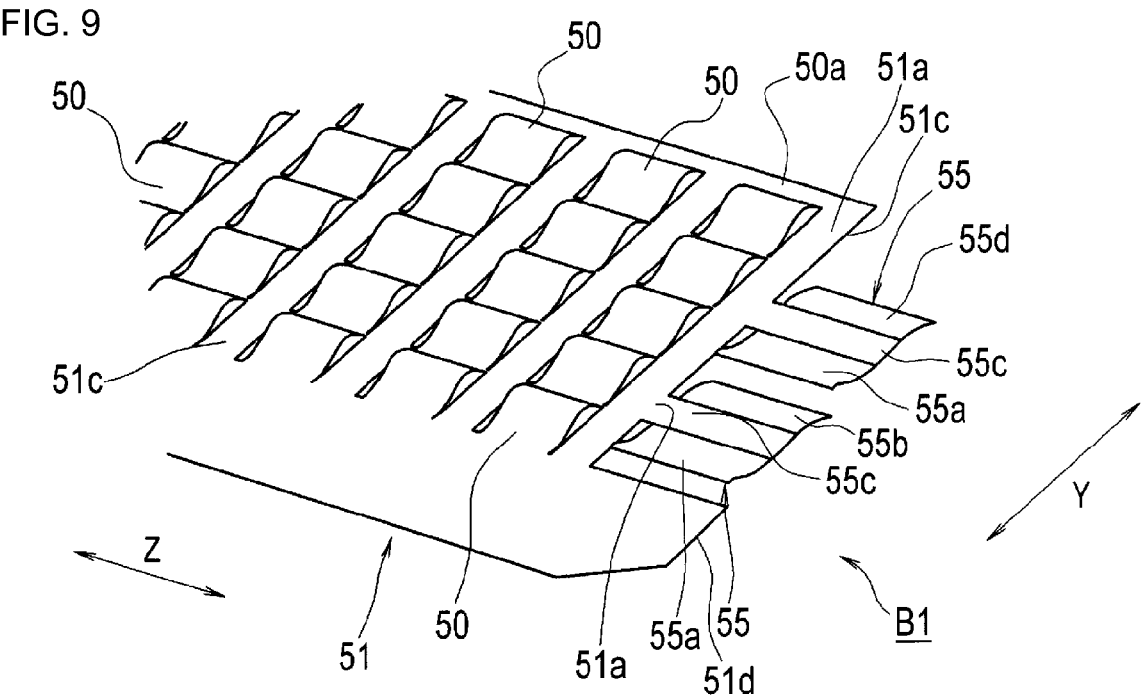
FIG. 9 is a partial perspective view of a displacement absorber of a first example which forms part of the fuel cell stack in the first embodiment of the present invention.

FIG. 4 is a partially enlarged view showing details of a portion in the circle I in FIG. 3, FIG. 5 is a cross-sectional view of a portion along the II-II line shown in FIG. 4, FIG. 6 is a cross-sectional view of a portion along the III-III line shown in FIG. 4, FIG. 7 is a cross-sectional view of a portion along the IV-IV line shown in FIG. 4, and FIG. 8 is a cross-sectional view of a portion along the V-V line shown in FIG. 4. Moreover, FIG. 9 is a partial perspective view of the displacement absorber of the first example which forms part of the fuel cell stack.

Parts equivalent to those described in the aforementioned embodiment are denoted by the same reference numerals and description thereof is omitted.

Each of the separators 40, 41 is formed by pressing a metal plate made of stainless steel or the like, and is formed to have the same shape and size as the cell frame 42 described above.

Flow-spread preventing portions C1, C2 for preventing the cooling fluid from flowing out of the active area a facing the membrane electrode assembly 30 are formed on both side portions (one side portion thereof is not illustrated) of the separator 41 out of the separators 40, 41.

The flow-spread preventing portions C1, C2 shown in the embodiment are formed at predetermined intervals in a flow direction Y of the power generation gases to protrude into a cooling fluid passage S1 to be described later.

Each of the flow-spread preventing portions C1 is formed to have a substantially triangular contour in a plan view and to have a length of L1 (see FIG. 8) from a side peripheral edge 51d (see FIG. 5) of the displacement absorber B1 to the active area a. Each flow-spread preventing portion C1 is disposed at a flow start end (lower end in FIG. 4) of the cooling fluid passage S1.

Moreover, a base end 41e' (see FIG. 4) of an inclined piece 41e of each flow-spread preventing portion C1 is located upstream of a distal end 41e" in the flow direction Y. This causes the cooling fluid flowing through the cooling fluid passage S1 to flow closer to the active area a.

Each of the flow-spread preventing portions C2 is formed to have a contour with a substantially-elongated hole shape in a plan view and to have a length of L2 (see FIG. 5) from the side peripheral edge 51d described above to a portion close to the active area a. Each flow-spread preventing portions C2 is disposed to face a corresponding one of flat pieces 55c of the displacement absorber B1 which will be described later in detail.

In the cell unit A1 configured as described above, the hydrogen-containing gas or the oxygen-containing gas flows from one end portion to the other end portion of the cell frame 42 or from the other end portion to the one end portion. In other words, the power generation gases flow in the flow direction Y.

The cell frame 42 and both of the separators 40, 41 which are described above are subjected to sealing in peripheral edges thereof to be joined together in a liquid-tight manner and thereby form the cell unit A1.

Between the cell units A1, A1 which are stacked one on the other, the separators 40, 41 of the respective cell units A1, A1 are joined in an air tight and liquid tight manner to form therebetween the cooling fluid passage S1 for cooling fluid to flow (see FIGS. 5 to 8).

Moreover, the manifolds H of the cell frame 42 and the separators 40, 41 communicates with one another and gas flow ports and cooling fluid flow ports (not illustrated) extending in the stacking direction X of the cell units A1 are thereby formed.

The displacement absorber B1 of the first example shown in the embodiment is inserted in the cooling fluid passage S1 defined between the cell units A1, A1 adjacent to each other.

The displacement absorber B1 is configured to elastically absorb a displacement of the cell units A1 in the stacking direction X of the cell units A1 and multiple elastic protrusions 50 are formed and arrayed on a surface of a base plate 51 on one side (upper side in the drawing).

Moreover, as shown in FIG. 9, multiple flow-spread preventing protrusions 55 are formed and arrayed along a peripheral edge 51c of the base plate 51 which is parallel with the flow direction Y of the cooling fluid.

The elastic protrusions 50 extend in the flow direction Y of the cooling fluid flowing through the cooling fluid passage S1 described above and are arranged at predetermined intervals in the flow direction Y and in a direction Z orthogonal to the flow direction Y.

The elastic protrusions 50 are formed integrally with the base plate 51 formed of a conductive metal plate. The elastic protrusions 50 are inclined in the same direction with respect to a plane parallel with the flow direction Y of the cooling fluid flowing through the cooling fluid passage S1 and are formed to be plate-shaped bodies of the same shape and size.

Each of the elastic protrusions 50 is formed integrally by being cut out and bent upward from the base plate 51 in such a way that the elastic protrusion 50 has a vertical rectangle shape in a view in the flow direction Y and has a gentle S-shape in a view in the direction Z orthogonal to the flow direction Y.

The flow-spread preventing protrusions 55 are provided to prevent the cooling fluid from flowing out to portions other than the active area (power generation region) a facing the membrane electrode assembly 30. The flow-spread preventing protrusions 55 are formed and arrayed along the peripheral edge 51c of the base plate 51 in such a way that multiple flow-spread preventing protrusions 55 are arrayed at predetermined intervals in the flow direction Y on each of both sides of the cooling fluid passage S1 described above.

The flow-spread preventing protrusions 55 are formed integrally with the base plate 51 described above. The flow-spread preventing protrusions 55 are inclined in the same direction with respect to a plane parallel with the flow direction Y and are formed to be plate-shaped bodies of the same shape and size.

Specifically, each of the flow-spread preventing protrusions 55 is formed by integrally including the flat piece (center flat piece) 55c connected to the base plate 51 described above, an upstream piece 55a extending from the flat piece 55c while inclining toward one side (upper side in FIG. 9), and a downstream piece 55b extending from the flat piece 55c while inclining toward the other side (lower side in FIG. 9).

Note that the upstream piece 55a and the downstream piece 55b can be formed in reverse in the upstream and downstream direction.

More specifically, the upstream piece 55a is cut out and bent upward toward the one side of the base plate 51 and the downstream piece 55b is cut out and bent downward toward the other side of the base plate 51 with the flat piece 55c connected to a rib 51a of the base plate 51. Note that the flat piece 55c is provided on the same plane as the base plate 51 described above.

In other words, each of the flow-spread preventing protrusions 55 has a horizontal rectangle shape in the view in the flow direction Y, and is set in a gently-inclined posture in which a predetermined angle of attack is formed with respect to the flow direction Y in the view in the direction Z orthogonal to the flow direction Y.

The elastic protrusions 50 and the flow-spread preventing protrusions 55 which are described above can be formed to have finer structures by bending portions trimmed through cutting processes such as punching and processes involving removable of materials such as etching.

As shown in FIG. 4, the displacement absorber B1 described above is disposed in the cooling fluid passage S1 in such a way that the base plate 51 is in contact with the separator 40 with upper peripheral edges 50a of the elastic protrusions 50 and the upstream pieces 55a of the flow-spread preventing protrusions 55 being in contact with the separator 41.

Moreover, as shown in FIGS. 5 and 7, each of the flow-spread preventing portions C2 is in contact with the flat piece 55c of a corresponding one of the flow-spread preventing protrusions 55. This reduces an effect of an angular moment generated when the power generation gas flows and hits the flow-spread preventing protrusions 55 and the similar effects.

The following effects can be obtained from the fuel cell stack 10 of the first embodiment described above.

It is possible to improve the cooling efficiency by preventing the cooling fluid from spreading out of the active area a and to thereby improve the power generation efficiency.

It is possible to hold down the flow-spread preventing protrusions 55 with the flow-spread preventing portions C2 formed as protruding portions and to thereby reduce or prevent displacement due to the effect of the angular moment generated in the flow-spread preventing protrusions 55 and the similar effects.

Figure 10:
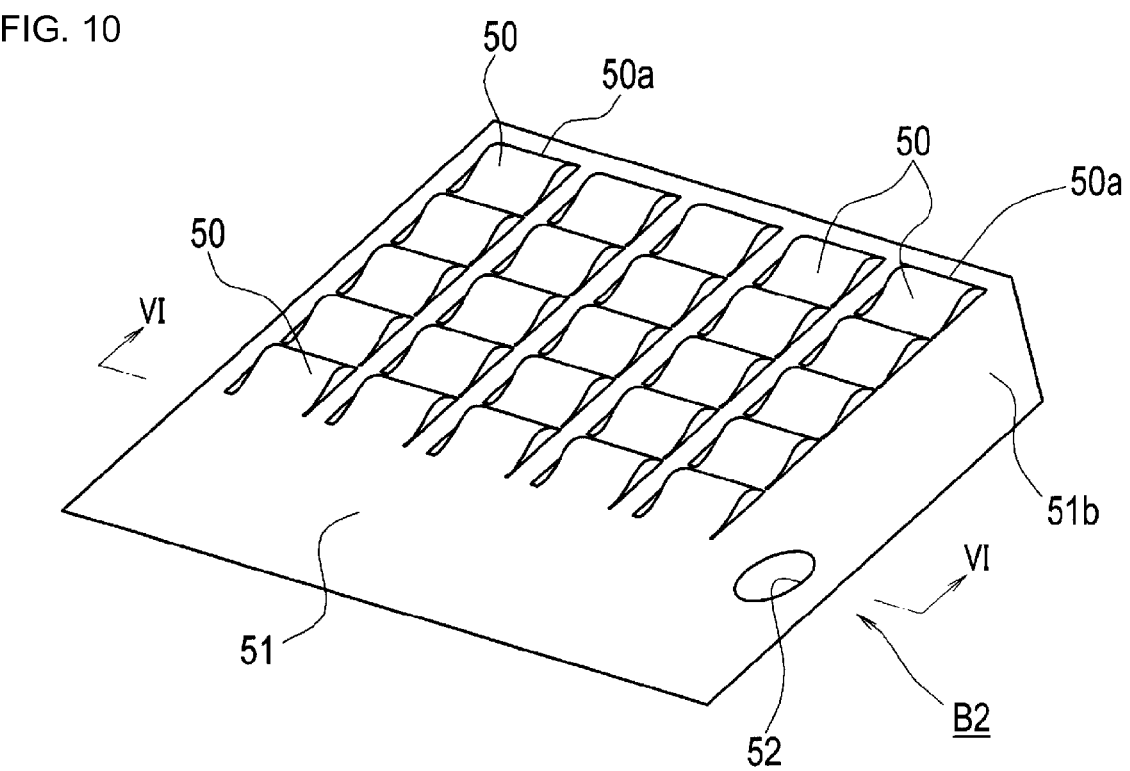
FIG. 10 is a partial perspective view of a displacement absorber of a second example which forms part of the fuel cell stack in the first embodiment of the present invention.
Figure 11:
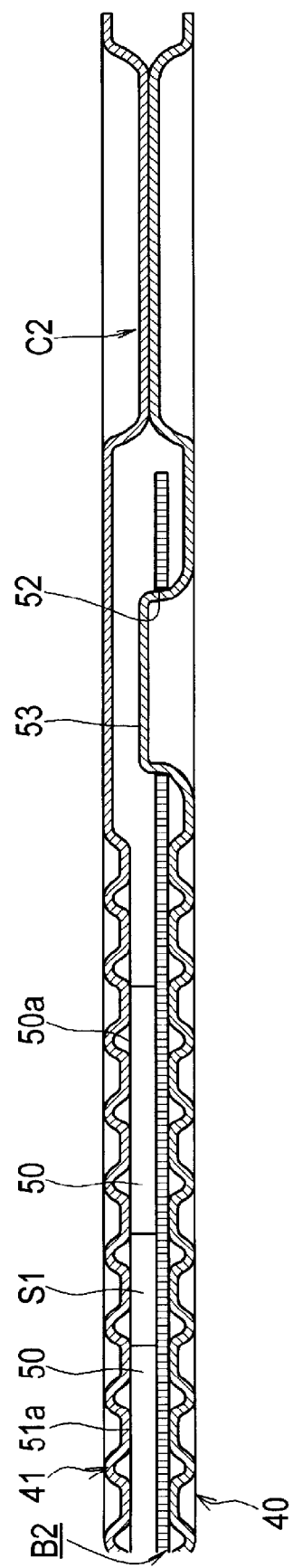
FIG. 11 is an enlarged cross-sectional view of a portion along the VI-VI line shown in FIG. 10.

Next, a displacement absorber of a second example is described with reference to FIGS. 10 and 11. FIG. 10 is a partial perspective view of the displacement absorber of the second example. FIG. 11 is an enlarged cross-sectional view of a portion along the VI-VI line shown in FIG. 10. Parts equivalent to those in the aforementioned embodiment are denoted by the same reference numerals and description thereof is omitted.

In the displacement absorber B2 of the second example, only the elastic protrusions 50 are formed integrally with the base plate 51 formed of the conductive metal plate described above. In other words, the displacement absorber B2 is provided with no flow-spread preventing protrusions described above.

An alignment portion 52 for aligning the displacement absorber B2 is formed in one side piece 51b of the base plate 51 described above. The alignment portion 52 of the example is formed as a circular hole but may be formed in any publicly known shape.

Meanwhile, a cylindrical mating protrusion 53 (see FIG. 11) which is configured to be engaged with the alignment portion 52 formed as the circular hole and which also serves as the flow-spread preventing portion is formed in the separator 40 at a position facing the alignment portion 52.

In other words, the separator 40 and the displacement absorber B2 can be easily aligned with each other by engaging the mating protrusion 53 of the separator 40 and the alignment portion 52 with each other.

Figure 12:
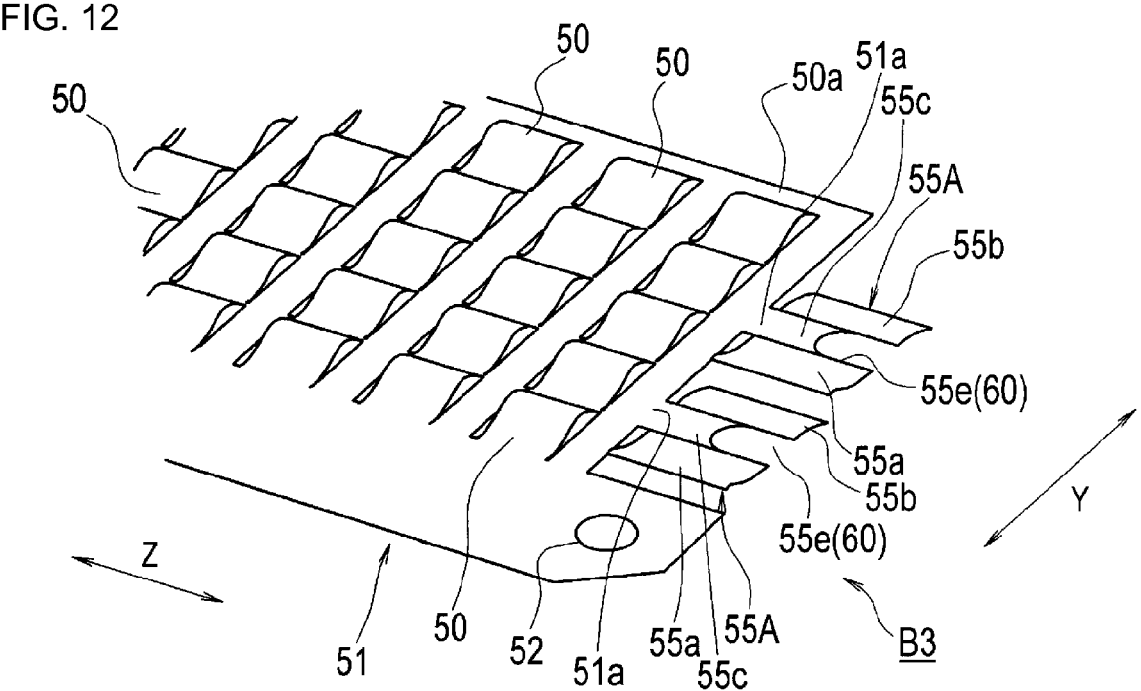
FIG. 12 is a perspective view showing part of a displacement absorber of a third example which forms part of the fuel cell stack in the first embodiment of the present invention.
Figure 13:
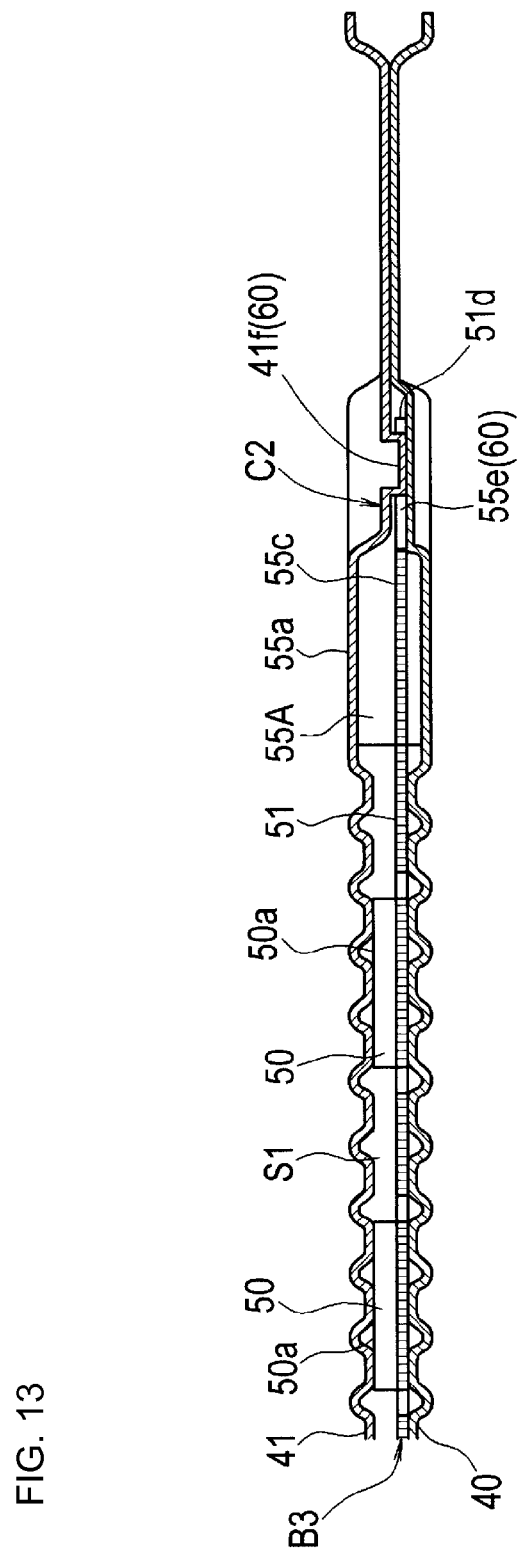
FIG. 13 is a cross-sectional view of a portion corresponding to the portion along the II-II line shown in FIG. 4.
Figure 14A:
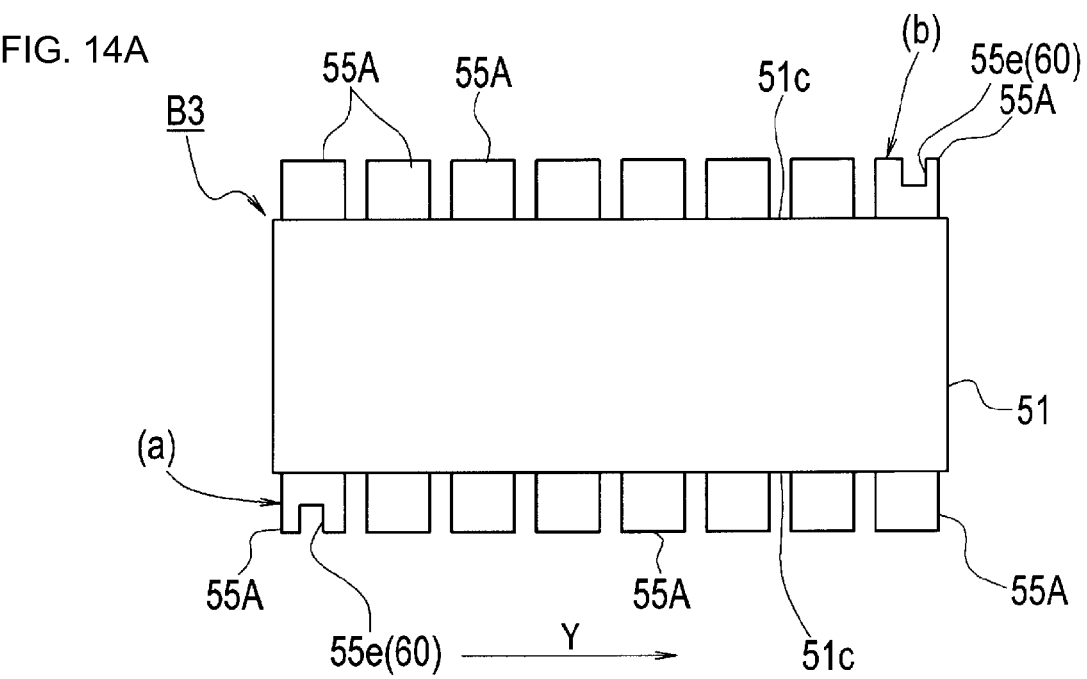
FIG. 14A is a plan view schematically showing an example of formation positions of separator-side mating portions in the displacement absorber of the third example.
Figure 14B:
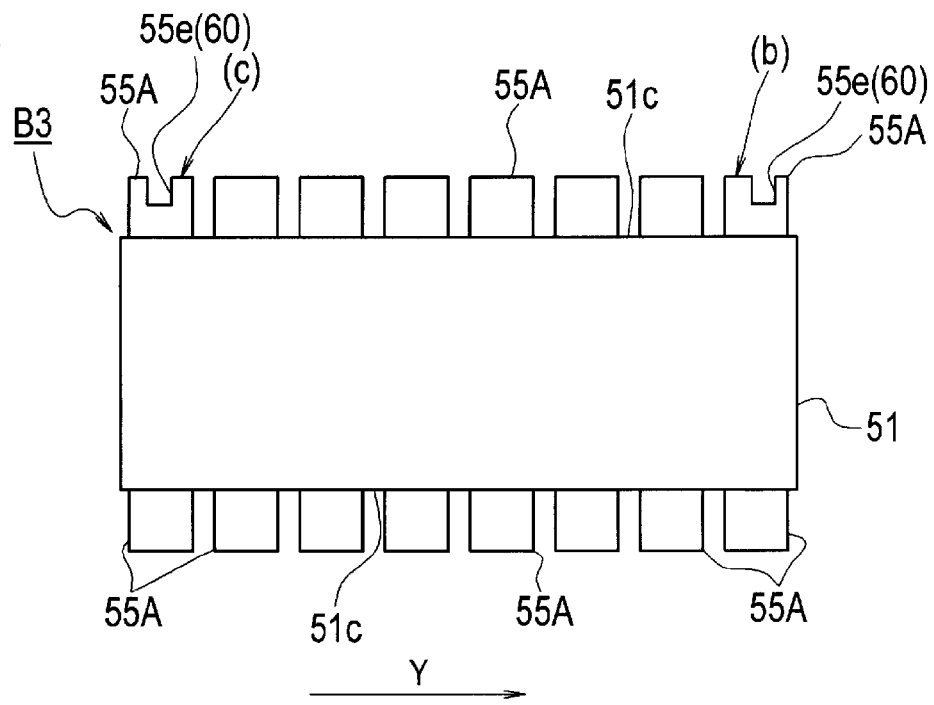
FIG. 14B is a plan view schematically showing another example of the formation positions of the separator-side mating portions of FIG. 14A.

Next, a displacement absorber of a third example is described with reference to FIGS. 12 to 14B. FIG. 12 is a partial perspective view of the displacement absorber of the third example and FIG. 13 is a cross-sectional view of a portion corresponding to the portion along the II-II line shown in FIG. 4. Moreover, FIG. 14A is a plan view schematically showing an example of formation positions of separator-side mating portions in the displacement absorber of the third example and FIG. 14B is a plan view schematically showing another example of the formation positions of the separator-side mating portions.

Parts equivalent to those described in FIGS. 1 to 11 are denoted by the same reference numerals and description thereof is omitted.

The displacement absorber B3 of the third example has a configuration similar to that of the aforementioned displacement absorber B 1, but is different in that flow-spread preventing protrusions 55A are provided with displacement absorber-side mating portions 55e for alignment of the displacement absorber B3 relative to the separator 40 (41).

The displacement absorber-side mating portions 55e are provided in the flow-spread preventing protrusions 55A and are thus provided outside the active area a.

Each displacement absorber-side mating portion 55e is formed in a groove shape extending from an outer edge of the flat piece (center flat piece) 55c of the flow-spread preventing protrusion 55A to an intermediate portion thereof.

Meanwhile, in the flow-spread preventing portion C2 of the separator 41 which faces and comes in contact with the flat piece 55c, a separator-side mating portion 41f (see FIG. 13) having a bottomed cylindrical shape engaging with the displacement absorber-side mating portion 55e is formed to protrude toward the base plate 51.

In the embodiment, a displacement absorber alignment structure 60 is formed of the separator-side mating portion 41f and the displacement absorber-side mating portion 55e.

Specifically, the separator 41 (40) and the displacement absorber B3 can be aligned with each other by engaging the separator-side mating portion 41f and the displacement absorber-side mating portion 55e with each other.

In the embodiment, the displacement absorber-side mating portions 55e, and therefore also the displacement absorber alignment structures 60, are formed in two or more flow-spread preventing protrusions 55A, 55A.

The displacement absorber alignment structures 60 are provided in some of the multiple arrayed flow-spread preventing protrusions 55A including the flow-spread preventing protrusions 55A, 55A at an upstream-side end location and a downstream-side end location in the flow direction Y.

Specifically, the displacement absorber-side mating portions 55e, and therefore also the displacement absorber alignment structures 60, are provided in the flow-spread preventing protrusion 55A denoted by (a) which is located at the upstream-side end location of one peripheral edge 51c in the flow direction Y and in the flow-spread preventing protrusion 55A denoted by (b) which is located at the downstream-side end location of anther peripheral edge 51c in the flow direction Y, the one peripheral edge 51c and the other peripheral edge 51c being two peripheral edges of the base plate 51 which are parallel with the flow direction Y.

Moreover, as shown in FIG. 14B, the displacement absorber-side mating portions 55e, and therefore also the displacement absorber alignment structures 60, are provided in the flow-spread preventing protrusion 55A denoted by (c) which is located at the upstream-side end location of one peripheral edge 51c in the flow direction Y and in the flow-spread preventing protrusion 55A denoted by (b) which is located at the downstream-side end location of the one peripheral edge 51c in the flow direction Y, the one peripheral edge 51c being one of the two peripheral edges of the base plate 51 which are parallel with the flow direction Y.

The alignment of the displacement absorber can be thereby more surely performed.

Figure 15A:
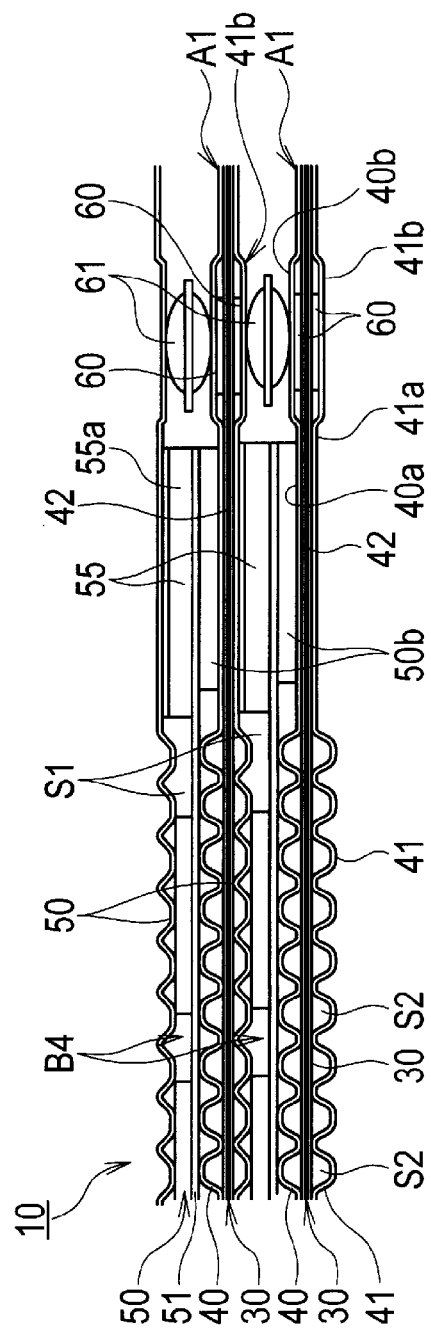
FIG. 15A is a partial cross-sectional view of a fuel cell stack in a second embodiment of the present invention.
Figure 15B:
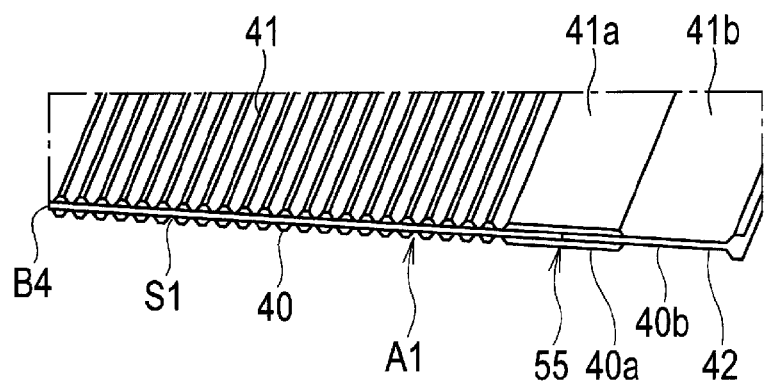
FIG. 15B is a perspective view for explaining separators adjacent to one another and cooling fluid passages.
Figure 15C:
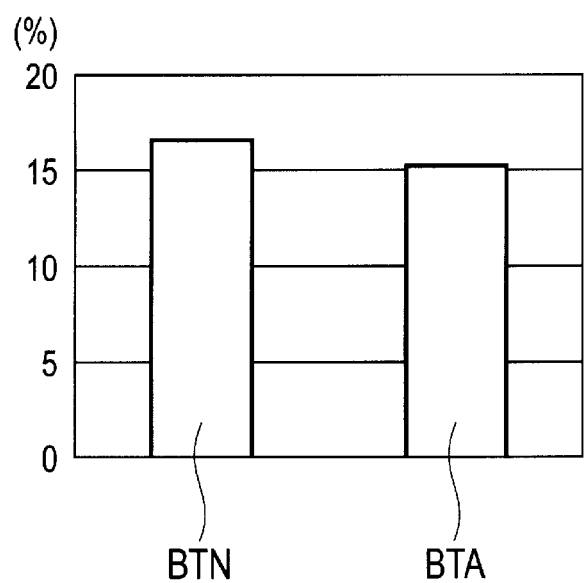
FIG. 15C is a graph showing a flow rate of a cooling fluid depending on presence and absence of flow-spread preventing protrusions.

FIG. 15A is a partial cross-sectional view of a fuel cell stack in a second embodiment of the present invention, FIG. 15B is a perspective view for explaining separators adjacent to one another and cooling fluid passages, and FIG. 15C is a graph showing a flow rate of a cooling fluid depending on presence and absence of flow-spread preventing protrusions.

Figure 16A:
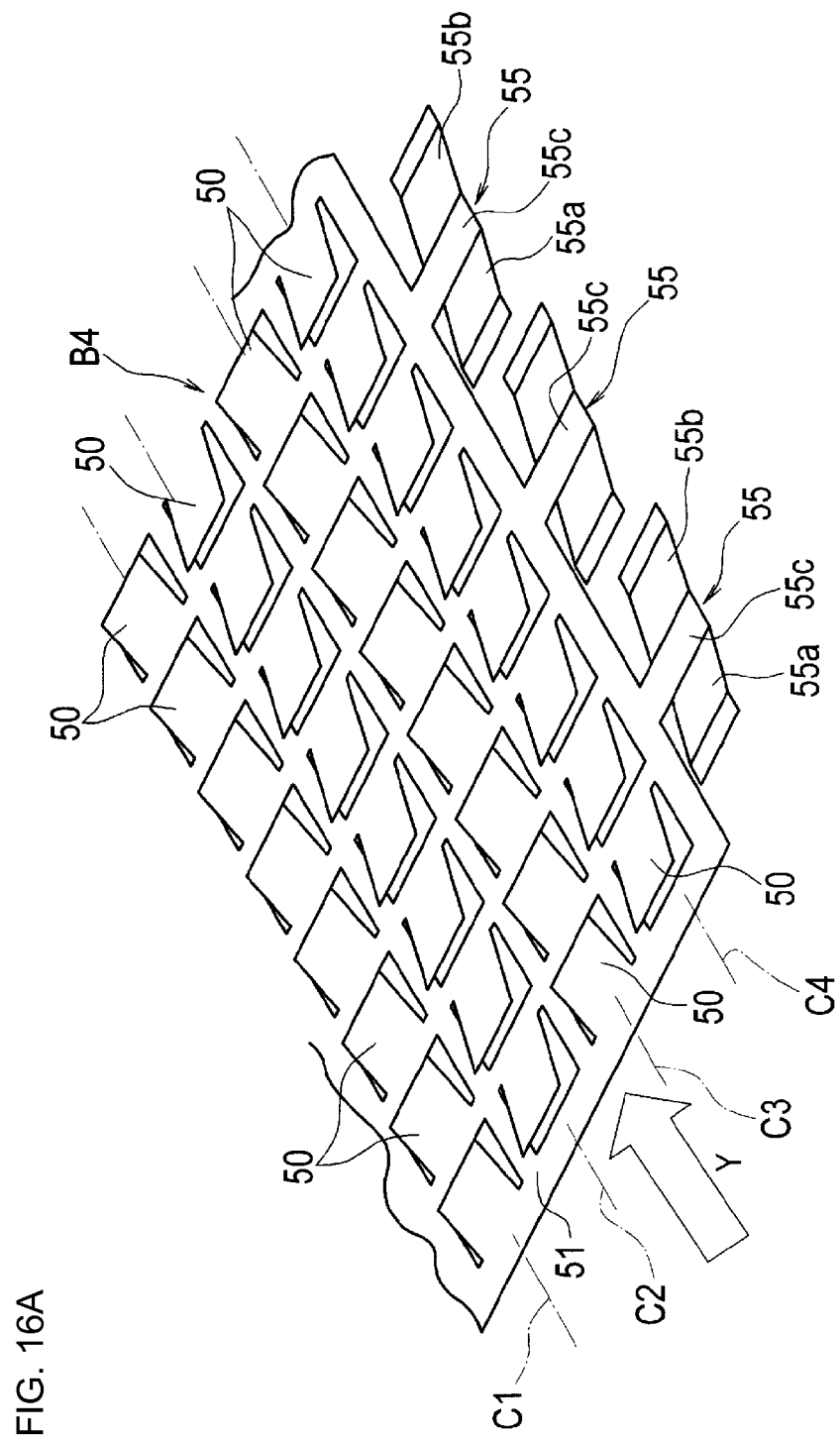
FIG. 16A is a perspective view for explaining a displacement absorber of a fourth example which forms part of the fuel cell stack shown in FIG. 15A.
Figure 16B:
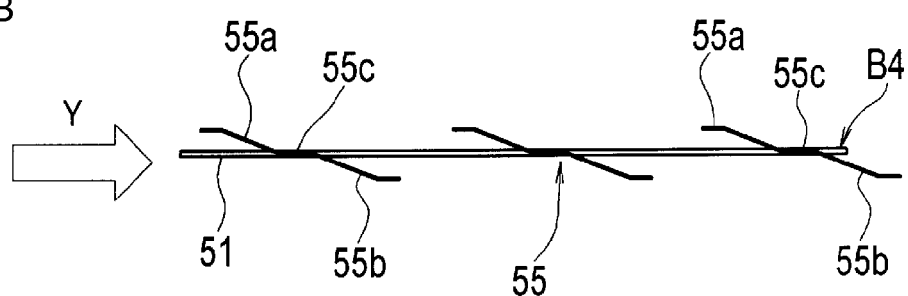
FIG. 16B is a side view of the displacement absorber in FIG. 16A.

FIG. 16A is a perspective view for explaining a displacement absorber of a fourth example which forms part of the fuel cell stack shown in FIG. 15A and FIG. 16B is a side view of the displacement absorber.

Part equivalent to those described in the aforementioned embodiment are denoted by the same reference numerals and description thereof is omitted.

The separators 40, 41 in the embodiment are made of stainless steel and are formed by pressing to have shapes symmetric to each other.

The separators 40, 41 are each formed in such a way that a portion corresponding to a membrane electrode assembly 30 has a wave shape. Gas passages S2, S2 for an anode gas (hydrogen-containing gas) and a cathode gas (oxygen-containing gas: air) are thereby formed between the separators 40, 41 and the membrane electrode assembly 30 by using recessed portions of the wave shape. In FIG. 15A, a direction perpendicular to the sheet is the flow direction of the gases.

In both of the separators 40, 41, portions from an outer peripheral portion of the membrane electrode assembly 30 to an end portion of a cell frame 42 are flat portions 40a, 41a. Since the portions of the separators 40, 41 corresponding to the membrane electrode assembly 30 have the wave shape, the flat portions 40a, 41a are on the same plane as tip portions of the wave-shape protruding portions on the gas passage S2 sides.

In the separators 40, 41, the flat portions 40a, 41a thereby come in surface contact with the cell frame 42 and the membrane electrode assembly 30, and hold the cell frame 42 and the membrane electrode assembly 30 therebetween.

The separators 40, 41 have groove portions 40b, 41b which are open to the inside, in middle areas of the flat portions 40a, 41a. Gas seals 60, 60 hermetically holding the cell frame 42 therebetween are disposed respectively in the groove portions 40b, 41b.

Moreover, in the separators 40, 41 of the respective cell units A1 adjacent to one another, sealing members 61, 61 are disposed outside the groove portions 40b, 41b, the sealing members 61, 61 sealing spaces between the groove portions 40b, 41b in a liquid tight manner.

Furthermore, since the separators 40, 41 have the shapes symmetric to each other, a gap between the flat portions 40a, 41a is larger than a gap in the wave-shaped portion corresponding to the membrane electrode assembly 30 in the cooling fluid passage S1 formed between the stacked cell units A1.

In other words, in the cooling fluid passage S1, a gap in an end portion (marginal portion) extending in the flow direction Y which is a direction perpendicular to the sheet is large. Accordingly, flow of the cooling fluid in a space between the flat portions 40a, 41a is facilitated. In this respect, a fuel cell stack 10 is provided with a displacement absorber B4 including flow-spread preventing protrusions 55 in the end portion of the cooling fluid passage S1.

As shown in FIG. 16A and 16B, the displacement absorber B4 of a fourth example is formed of a conductive metal plate and has a structure in which many elastic protrusions 50 are arranged on one surface of a base plate 51 in matrix.

Specifically, the elastic protrusions 50 in the embodiment are arrayed to form protrusion rows C1 to C4 each formed by providing multiple elastic protrusions 50 in an array extending in the flow direction Y.

The elastic protrusions 50 forming the protrusion row C1 are inclined in the same direction with respect to a plane parallel with the flow direction Y of the cooling fluid flowing through the cooling fluid passage S1, and are formed to be plate-shaped bodies of the same shape and size.

Specifically, these elastic protrusions 50 are arrayed in such a way that a plate surface portion forming an acute angle in each elastic protrusion 50 faces a downstream side in the flow direction Y.

The elastic protrusions 50 forming the protrusion row C2 are inclined in the direction opposite to the inclination direction of the protrusion row C1, with respect to the plane parallel with the flow direction Y of the cooling fluid, and are formed to be plate-shaped bodies of the same shape and size.

In other words, the elastic protrusions 50 forming the protrusion row C2 are arrayed in such a way that a plate surface portion forming an acute angle in each elastic protrusion 50 faces an upstream side in the flow direction Y.

In the embodiment, the elastic protrusions 50 of the odd number rows C1, C3 are each inclined in such a way that the plate surface portion forming the acute angle therein faces the downstream side in the flow direction Y, and the elastic protrusions 50 of the even number rows C2, C4 are each inclined in such a way that the plate surface portion forming the acute angle therein faces the upstream side in the flow direction Y.

Moreover, the flow-spread preventing protrusions 55 described above are formed integrally with the displacement absorber B4 at predetermined intervals in an end portion of the displacement absorber B4 which extends in the flow direction Y (end portion extending in a vertical direction).

The displacement absorber B4 is interposed between the separators 40, 41 included in the respective cell units A1, A1 adjacent to each other, and the flow-spread preventing protrusions 55 exist between the flat portions 40a, 41a of the separators 40, 41. In this case, the displacement absorber B4 is disposed in the cooling fluid passage S1 in such a way that the base plate 51 is disposed in a portion corresponding to an active area (power generation region) of the cell unit A1, i.e. the membrane electrode assembly 30 and that the flow-spread preventing protrusions 55 are disposed between the flat portions 40a, 41a, i.e. in a portion corresponding to an area outside the active area (power generation area) of the cell unit A1.

In the fuel cell stack 10 having the configuration described above, an anode gas and a cathode gas are supplied to each of the cell units A1 to perform power generation by generating electric energy through electrochemical reaction. In addition, the cooling fluid flows through the cooling fluid passage S1 between the cell units A1, A1 adjacent to each other to cool the cell units A1.

At this time, in the fuel cell stack 10, the flow-spread preventing protrusions 55 integral with the displacement absorber B4 hinders the flow of the cooling fluid in the portion between the flat portions 40a, 41a, i.e. in the portion corresponding to the area outside the active area (power generation region) of each cell unit A1. As a result, a sufficient amount of the cooling fluid flows through the portion corresponding to the power generation region of the cell unit A1. The fuel cell stack 10 can be thereby improved in cooling efficiency.

The following effects can be obtained from the fuel cell stack configured as described above.

As shown in FIG. 15C, in the cooling fluid passage S1, the flow rate (vertical axis in FIG. 15C) of the cooling fluid flowing through portions other than a reaction surface (other than the power generation region) was observed. As a result, it is found that the flow mount rate becomes smaller in the case (denoted by reference sign BTA in FIG. 15C) where the flow-spread preventing protrusions 55 are provided, compared to the case (denoted by reference sign BTN in FIG. 15C) where no flow-spread preventing protrusions 55 are provided. In other words, it is found that, in the cooling fluid passage S1, the flow rate of the cooling fluid flowing through the portion corresponding to the power generation region of the cell unit A1 is increased and the cooling effect is thereby improved.

The displacement absorber B4 can promote cooling as described above and, in addition, absorb a displacement of the separators 40, 41 due to thermal expansion in the cell units A1, swelling of the membrane electrode assemblies 30, or the like.

The displacement absorber B4 includes many elastic protrusions 50 in the base plate 51. Moreover, the flow-spread preventing protrusions 55 of the displacement absorber B4 have a cantilever structure and the flow-spread preventing protrusions 55 also have the spring function. Accordingly, the displacement absorbing function of the separators 40, 41 can be obtained in a wide area.

Each cell unit A1 includes the separators 40, 41 which have shapes symmetric to each other and which have flat portions 40a, 41a in surface contact with the cell frame 42 and the membrane electrode assembly 30. Accordingly, the cell unit A1 can be made thin. Moreover, the flow-spreading (marginal flow) of the cooling fluid which becomes notable when the cell unit A1 is made thin is prevented, and the cooling efficiency is thereby improved.

The flow-spread preventing protrusions 55 hinders the flow of the cooling fluid in the portion corresponding to the area outside the power generation region of the cell unit A1 and the cooling efficiency is thereby improved. Moreover, the flow-spread preventing protrusions 55 can absorb a displacement of the separators 40, 41 due to thermal expansion in the cell units A1, swelling of the membrane electrode assemblies 30, or the like.

Since the flow-spread preventing protrusions 55 are integrated with the displacement absorber B4, separate parts corresponding to the flow-spread preventing protrusions 55 are unnecessary and it is possible to reduce the number of parts and the manufacturing cost of the fuel cell stack 10.

The displacement absorber B4 can secure, in addition to the displacement absorbing function and the cooling promoting function described above, various functions including the function as a connector electrically connecting the cell units A1 to one another and the function of sufficiently absorbing a displacement in the stacking direction with a simple structure. Moreover, since the elastic protrusions 50 and the flow-spread preventing protrusions 55 can be formed integrally, the manufacturing cost of the displacement absorber B4 is low.

Furthermore, in the displacement absorber B4, the elastic protrusions 50 have a simple shape. Accordingly, it is possible to form the spring function portions 50 at a small pitch and to reduce the spring stiffness thereof. When the spring stiffness is small, the spring characteristic is such that load variation with respect to a displacement is small. Since variation in surface pressure is small, the electrical contact resistance of parts is stable even when there is a displacement in the compressed direction during operation or permanent set due to aging deterioration.

Figure 17:
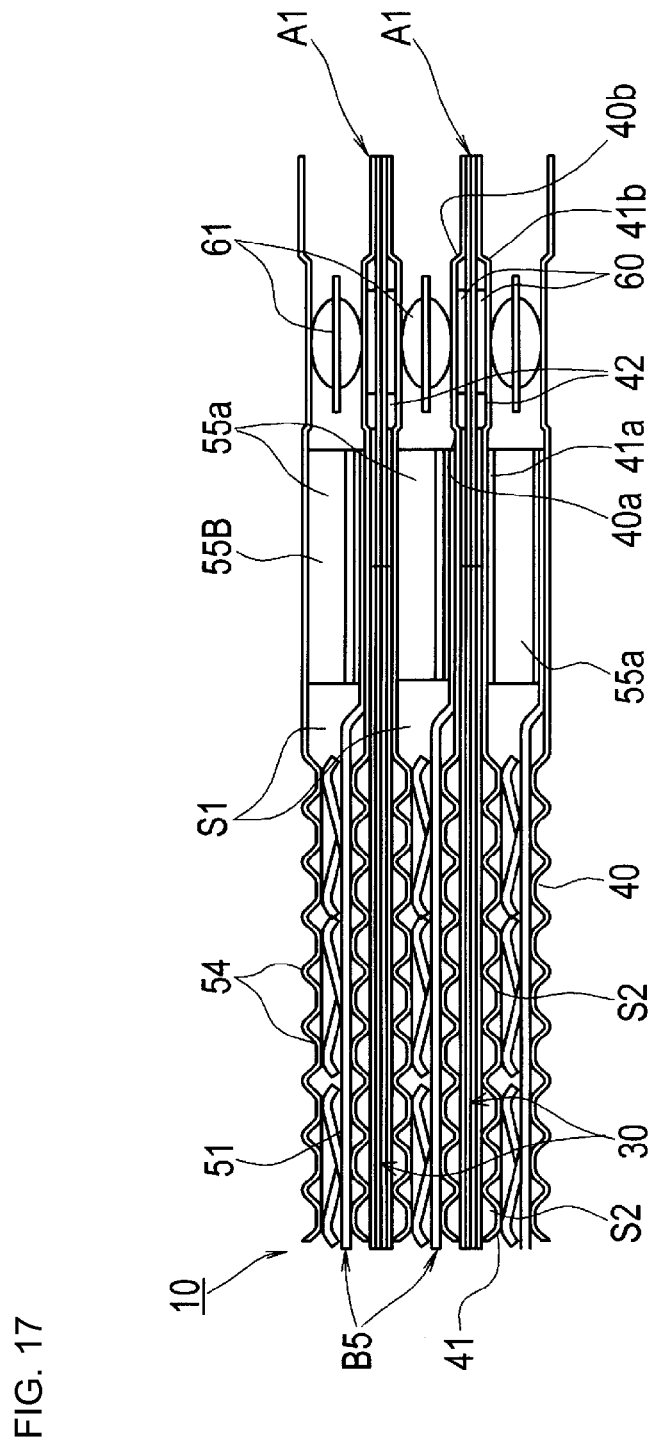
FIG. 17 is a partial cross-sectional view of a fuel cell stack in a third embodiment of the present invention.
Figure 18B:
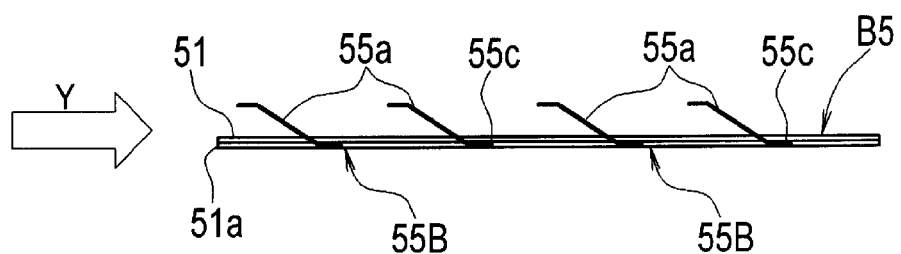
FIG. 18B is a side view of the displacement absorber shown in FIG. 18A.

Next, a displacement absorber B5 of a fifth example is described with reference to FIGS. 17, 18A, and 18B. FIG. 17 is a partial cross-sectional view of a fuel cell stack in a third embodiment of the present invention. FIG. 18A is a perspective view for explaining the displacement absorber of the fifth example which forms part of the fuel cell stack shown in FIG. 17 and FIG. 18B is a side view of the displacement absorber.

Parts equivalent to those described in the aforementioned embodiments are denoted by the same reference numerals and description thereof is omitted.

As shown in FIGS. 18A and 18B, the displacement absorber B5 of the fifth example is formed of a conductive metal plate and has a structure in which many elastic protrusions 54 are arranged on one surface of a base plate 51 in matrix.

Specifically, in the embodiment, the elastic protrusions 54 are arrayed to form protrusion rows C1 to C4 each formed by providing multiple elastic protrusions 54 in a row extending in a flow direction Y.

Each of the protrusion rows C1 to C4 is formed by alternately arranging the elastic protrusions 54 inclined toward an orthogonal direction Z2 that is orthogonal to the flow direction Y and the elastic protrusions 54 inclined toward an orthogonal direction Z1 that is opposite to the orthogonal direction Z2 are alternately arranged.

Specifically, each of the protrusion rows C1 to C4 is formed by alternately arranging in the flow direction Y the elastic protrusions 54 whose plate surface portions forming acute angles face in the orthogonal direction Z1 and the elastic protrusions 54 whose plate surface portions forming acute angles face in the orthogonal direction Z2.

Flow-spread preventing protrusions 55B are formed integrally with the displacement absorber B5 at predetermined intervals in an end portion of the displacement absorber B5 which extends in the flow direction Y (end portion extending in a vertical direction).

The flow-spread preventing protrusions 55B are formed integrally with a step portion 51a formed on one side portion of the base plate 51. The flow-spread preventing protrusions 55B are inclined toward the same direction with respect to a plane parallel with the flow direction Y, and are formed to be plate-shaped bodies of the same shape and size.

Specifically, each of the flow-spread preventing protrusions 55B is formed by integrally including a flat piece 55c connected to the base plate 51 and an upstream piece 55a extending from the flat piece 55c while inclining toward one side.

In other words, the upstream piece 55a is cut out and bent upward toward the one side of the base plate 51 with the flat piece 55c connected to the base plate 51.

The following effects can be obtained from a fuel cell stack using the displacement absorber B5 described above.

As in the embodiments described above, a sufficient amount of the cooling fluid flows through a portion corresponding to a power generation region (active area) of a cell unit A1 and the cooling efficiency can be thereby improved.

Moreover, in addition to the improved cooling, it is possible to absorb a displacement of the separators 40, 41 due to thermal expansion in the cell units A1, swelling of the membrane electrode assemblies 30, or the like.

Paired displacement absorbers B5, B5 holding one cell unit A1 therebetween can be different in arrangement of the elastic protrusions 54 and the flow-spread preventing protrusions 55B. This changes the flow state of the cooling fluid on both sides of the cell unit A1 and can thereby improve the cooling effect from both sides.

In addition, in respect to a fuel cell stack 10 as whole, supporting points provided by the elastic protrusions 54 and the flow-spread preventing protrusions 55B are disturbed to be located at many positions. This can contribute to further improvement in the displacement absorbing function.

The present invention is not limited to the aforementioned embodiments and the following modified embodiments can be carried out.

In the aforementioned embodiments, description is given of the example in which the flow-spread preventing portions are formed in one of the two separators. However, the flow-spread preventing portions can be formed in both of the two separators. In this case, the flow spread of the cooling fluid can be further reduced.

In the aforementioned embodiments, description is given of the example in which the displacement absorber alignment structure is formed in each of the flow-spread preventing protrusions at the upstream-side end location and the downstream-side end location in the flow direction Y, among the arrayed multiple flow-spread preventing protrusions. However, the displacement absorber alignment structures can be provided in three or more flow-spread preventing protrusions as a matter of course.

Although the present invention has been described above by reference to the embodiments and the example, the present invention is not limited to those, and it will be apparent to these skilled in the art that various modifications and improvements can be made.

The invention claimed is:
1. A fuel cell stack comprising:
cell units stacked on one another and each including a membrane electrode assembly and two separators defining gas passages on both sides of the membrane electrode assembly;
a cooling fluid passage for flowing a cooling fluid provided between the separators of each adjacent two of the cell units; and
a displacement absorber provided in the cooling fluid passage, wherein the displacement absorber comprises:
elastic protrusions provided in an array and configured to elastically absorb a displacement of the cell units in a stack direction; and
flow-spread preventing protrusions provided in an array and configured to prevent the cooling fluid from flowing out of an active area.

2. The fuel cell stack according to claim 1, wherein the elastic protrusions are provided in a surface of a base plate of the displacement absorber, and
  wherein each of the flow-spread preventing protrusions comprises a flat piece fixed to the base plate and an upstream piece extending from the flat piece.

3. The fuel cell stack according to claim 1, wherein the membrane electrode assembly is attached to a cell frame, and
  wherein each of the two separators comprises a flat portion in surface contact with the cell frame and the membrane electrode assembly.

4. The fuel cell stack according to claim 1, wherein at least one of the two separators comprises flow-spread preventing portions configured to prevent the cooling fluid from flowing out of the active area.

5. The fuel cell stack according to claim 1, wherein each of the two separators comprises flow-spread preventing portions configured to prevent the cooling fluid from flowing out of the active area.

6. The fuel cell stack according to claim 4, wherein the flow-spread preventing portions are in contact with the displacement absorber.

7. The fuel cell stack according to claim 4, wherein each of the flow-spread preventing portions is a protrusion portion protruding into the cooling fluid passage.

8. The fuel cell stack according to claim 4, wherein the displacement absorber comprises an alignment portion for aligning the displacement absorber with the flow-spread preventing portion.

9. The fuel cell stack according to claim 4, wherein the flow-spread preventing portions are in contact with the flow-spread preventing protrusions and prevent a displacement of the flow-spread preventing protrusions due to the cooling fluid hitting the flow-spread preventing protrusions.

10. The fuel cell stack according to claim 4, further comprising a displacement absorber alignment structure for alignment of the displacement absorber relative to the separators.

11. The fuel cell stack according to claim 10, wherein the displacement absorber alignment structure is provided outside the active area.

12. The fuel cell stack according to claim 10, wherein the displacement absorber alignment structure comprises a separator-side mating portion and a displacement absorber-side mating portion engaged with each other to align the separator and the displacement absorber.

13. The fuel cell stack according to claim 1, wherein the flow-spread preventing protrusions are formed and arrayed along a side edge of the base plate in which the elastic protrusions are formed, the side edge being parallel with a flow direction of the cooling fluid,
  wherein the flow-spread preventing protrusions each include a center flat piece connected to the base plate, an upstream piece extending from the center flat piece while inclining toward one side, and a downstream piece extending from the center flat piece while inclining toward the other side, and
  wherein the center flat piece, the upstream piece and the downstream piece are formed integrally with each other.

14. The fuel cell stack according to claim 10, wherein the displacement absorber alignment structure is provided in a plurality, and
  wherein two or more of the flow-spread preventing protrusions comprise the displacement absorber alignment structures.

15. The fuel cell stack according to claim 10, wherein the displacement absorber alignment structure is formed on flow-spread preventing protrusions of the arrayed flow-spread preventing protrusions located at an upstream-side end and a downstream side end in a flow direction of the cooling fluid.

* * * * *